(12) United States Patent
Noble

(10) Patent No.: US 6,771,446 B1
(45) Date of Patent: Aug. 3, 2004

(54) METHOD AND APPARATUS FOR DISC DRIVE DATA SECURITY USING A SERVO WEDGE

(75) Inventor: Gayle L. Noble, Boulder Creek, CA (US)

(73) Assignee: Seagate Technology LLC, Scotts Valley, CA (US)

(*) Notice: Subject to any disclaimer, the term of this patent is extended or adjusted under 35 U.S.C. 154(b) by 462 days.

(21) Appl. No.: 09/796,197

(22) Filed: Feb. 28, 2001

Related U.S. Application Data

(60) Provisional application No. 60/185,441, filed on Feb. 28, 2000.

(51) Int. Cl.[7] .......................... G11B 15/04; G06F 12/14
(52) U.S. Cl. .......................... 360/60; 711/111; 711/112; 711/163; 713/200
(58) Field of Search .......................... 360/60, 53, 77.03, 360/77.08; 711/163, 111–112, 114; 713/200; G06F 12/14

(56) References Cited

U.S. PATENT DOCUMENTS

| | | | |
|---|---|---|---|
| 5,799,145 A | * | 8/1998 | Imai et al. .................. 713/202 |
| 6,052,781 A | * | 4/2000 | Weber .......................... 713/200 |
| 6,397,270 B1 | * | 5/2002 | Cheswick ...................... 710/33 |

* cited by examiner

Primary Examiner—David Hudspeth
Assistant Examiner—Dan I Davidson
(74) Attorney, Agent, or Firm—Moser Patterson & Sheridan

(57) ABSTRACT

The present invention includes a method and apparatus to write and read copy protected data on a disc drive storage system using a servo wedge.

20 Claims, 6 Drawing Sheets

METHOD AND APPARATUS FOR DISC DRIVE DATA SECURITY USING A SERVO WEDGE

CROSS-REFERENCE TO A RELATED APPLICATION

This invention is based on U.S. Provisional Patent Application Serial No. 60/185,441 filed Feb. 28, 2000, entitled Fold Wedges To Hide Copy-Protected Data filed in the name of Gayle L. Noble. The priority of this provisional application is hereby claimed.

U.S. Patent application entitled "Method and Apparatus for Disc Drive Data Security Using a Defect list", Ser. No. 09/795,877 filed on Feb. 28, 2001, filed in the name of Gayle L. Noble is hereby incorporated herein by reference in its entirety.

U.S. Patent application entitled "Method and Apparatus for Disc Drive Data Security Using Physical Location", Ser. No. 09/795,623 filed on Feb. 28, 2001, filed in the name of Gayle L. Noble is hereby incorporated herein by reference in its entirety.

BACKGROUND OF THE INVENTION

1. Field of the Invention

The present invention generally relates to storing and retrieving copy-protected data on a disc drive.

2. Background of the Related Art

With the advent of the recording and playing of digital data, the need to store copy-protected data on disc drives becomes increasingly a necessity. Digital data is rapidly becoming the standard format by which industries, such as the entertainment industry, record and play multimedia. Paid for programming available to the public such as movies, sound tracks, music recordings, and the like, are increasing in demand. With digital recording, the public has more options than ever to listen to and/or record digital audio and video with unparalleled recording and playback quality.

One exemplary storage system being used more frequently to store digital multi-media is a computer controlled disc-based storage drive, e.g., a disc drive. Disc drives are capable of storing large amounts of digital data in a relatively small area. Disc drives store information on one or more recording media. The recording media conventionally take the form of a circular storage disc, e.g., media, having a plurality of recording tracks. Conventional disc drives include a plurality of the storage discs, vertically aligned, and each with at least one magnetic head for reading or writing information to the media. Typically, the magnetic head is attached to a positioner arm assembly that uses servomotors, such as stepper motors, to align the magnetic head above the disc. The location of the magnetic head is typically determined by a disc controller that is given the position of a data area on the disc to read or write data. The precise location of the head is typically accomplished by incorporating a closed-loop electro-mechanical servo system with a dedicated servo region, or regions, used to provide relatively continuous feedback to the system to maintain accurate positioning of the data heads.

Unfortunately, due to the high quality of the data and the fact that the data stored on digital storage systems, such as disc drives, is often unprotected and easily copied, the copying and selling of unauthorized copies of digitally recorded material is on the rise. Consider the case where a paid for program such as an audio file is downloaded via a network of computers such as the Internet, to a disc drive for play by a client who has paid for the file. Often, the file may be copied to another storage media or to another disc drive for use by another user unless copy protection is used. This often referred to as "pirating" a copy of the file. Additionally, the file may be repackaged and sold by others for profit without permission, often called "software piracy". In addition, the files may be shared by other users by playing from the owner's computer allowing the end user the benefit of the file without purchasing the file from the owner.

Conventional digital copy-protection schemes involve techniques such as registration, encryption, digital watermarking, 5C content, and the like. For example, software copy protection schemes often involve the use of copy-protection techniques that require issuing registration numbers with each package. When you install the software, you must enter the registration number. This technique does not prevent all unauthorized copying, but it limits it. In addition, users may not be able to obtain updates to a software product unless they own the original diskettes and documentation. Unfortunately, the user may forget, or may have difficulty in registering the software and may become frustrated if the software stops working and/or working properly.

For conventional multimedia, data stored on optical surfaces such as found on a digital versatile disc (DVD) is often copy protected. For example, the digital-video format includes a content scrambling system (CSS) to prevent users from copying discs. The DVD system may also use key based techniques such as the SC technique that has software keys that expire after use. Unfortunately, this means that today's DVD players may not be able to play DVD-video discs without a software and/or hardware upgrade to decode the encrypted and/or keyed data even though the use may be authorized.

Another issue with conventional copy protection is that of making backups of the data. For example, a user may have a computer that they need to backup the data, conventional encryption techniques often require that a hardware and/or specific software key(s) be used before the data can be successfully copied. Unfortunately, the user may not have the correct hardware or software key to allow the transfer of the data and may become frustrated.

Furthermore, most conventional copy protection techniques such as CSS are defeated over time causing the digital-video and software industry to constantly upgrade the hardware, and/or software techniques to combat the unauthorized copying. The constant upgrading and development of protection techniques that are eventually exposed and defeated causes an increase in the cost of the product as well as possible incompatibility issues with existing systems.

Thus, what is needed is a method that allows the recording and playing of copy protected material to the user without the ability to copy the data or use the data in an unauthorized manner without affecting the compatibility of the storage device to operate with non-copy protected data.

SUMMARY OF THE INVENTION

The present invention generally provides a method and apparatus for storing and retrieving copy protected data within storage devices such as a disc drive. One aspect of the present invention provides a method for writing on a disc drive data to be copy protected, the steps include providing data to be copy protected, copying a first data table to a second data table writing the data to be copy protected to a least one data sector within at least a first data wedge and modifying, within the first data list, the status of at least one servo wedges adjacent and corresponding to the data wedge, as defective.

Another aspect of the invention provides a method for reading copy protected data from a disc drive, the steps include determining if a request to read copy protected data has been issued, and if the request to read copy protected data has not been issued then reading at least one first servo status from a first data table wherein the first servo status indicates the a servo wedge as defective, but, if the request to read copy protected data has been issued then reading a second servo status from a second data list which indicates the servo wedge as valid and reading the data from the corresponding data wedge.

One aspect of the present invention provides a disc drive system comprising a signal-bearing media means for storing data, a code memory means coupled to a read/write controller means for controlling the reading and writing of data to the signal-bearing media, a means for reading and writing the data to the signal-bearing media and a processor means coupled to the code memory and the read/write controller. The processor includes a program which, when executed on the processor for a write sequence, is configured to perform the steps of copying a first data table to a second data table, writing data to be copy protected to at least one data wedge of the signal-bearing media, and modifying, within the first data table, the status of at least one servo wedge corresponding to the data wedge, as defective. When the program is executed on the processor for a read sequence, is configured to perform the steps of determining if a request to read copy protected data has been issued, if the request to read copy protected data has not been issued then reading at least one first servo wedge status from the first data table wherein the servo status indicates the location of the data as defective, but, if the request to read copy protected data has been issued then reading a second servo wedge status data from the second data table wherein the servo status indicates the location of the data as valid and reading the data.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

Other features and advantages of the invention will become apparent to a person of skill in this field who studies the following description of an embodiment given below in association with the following drawings.

DETAILED DESCRIPTION OF THE PREFERRED EMBODIMENT

Embodiments of the invention have particular advantages in electronic data storage systems. One exemplary electronic data storage system commonly used in the computer industry, well suited for supporting the digital data copy protection method described herein, is known as a disc drive. As will be described below, aspects of the preferred embodiment pertain to specific method steps implementable on computer disc-drive systems.

In one embodiment, the invention may be implemented as part of a computer program-product for use with computer disc-drive systems. The programs defining the functions of a preferred embodiment can be provided to the disc drive via a variety of signal-bearing media, which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disc drive); or (iii) information conveyed to a computer by communications medium, such as through a computer or telephone network, including wireless communication. Such signal-bearing media, when carrying computer-readable instructions that direct the functions of the present invention, represent alternative embodiments of the present invention. It may also be noted that portions of the product program may be developed and implemented independently, but when combined together are embodiments of the present invention.

Figure 1:
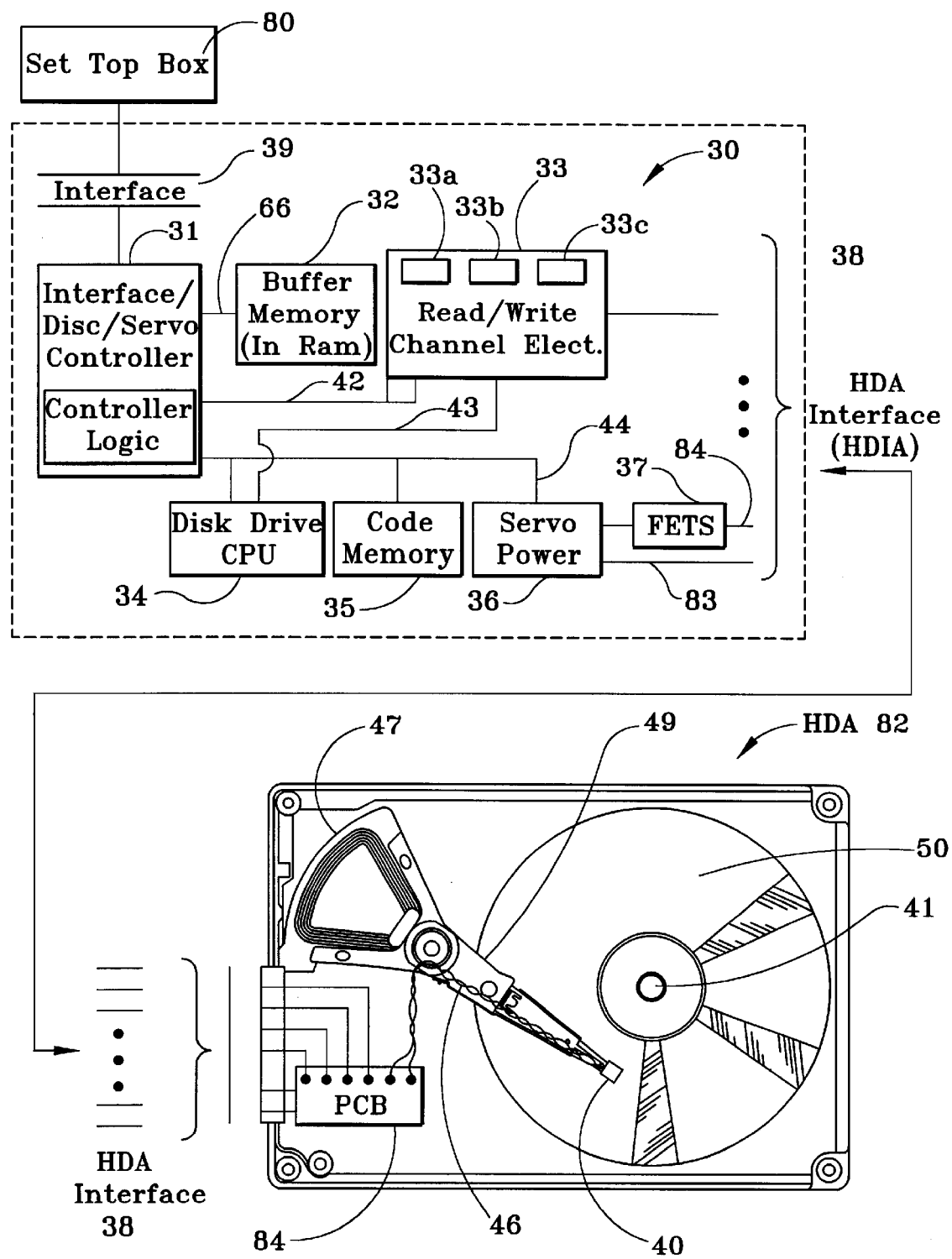
FIG. 1 is a plan view of a typical disc-based apparatus for reading and writing data on a media wherein the present invention may be used to advantage.

FIG. 1 is a plan view of a typical disc-based apparatus for reading and writing data on a media wherein the present invention may be used to advantage. FIG. 1 illustrates one embodiment of the invention including disc drive electronics 30 which in general includes an interface 39 adapted to receive external signals and data, and a Head Disc Assembly Interface (HDAI) 38 for connecting the disc drive electronics 30 to the head disc assembly (HD) 82. The HD 82 includes read/write transducer head(s) 40 coupled via wires 46 to the HDIA 38, a spindle motor 41, an actuator arm 49, a servo actuator 47, and other disc drive components that are well known in the art. The read/write transducer head(s) 40 are mounted on the actuator arm 49. As the servo actuator 47 moves the actuator arm 49, the read/write transducer head(s) 40 fly above a media 50 to read and write data to the media 50. The media 50 typically includes a disc or discs coated with a recording material such as ferrous iron, magneto-optical media, and other materials adapted to hold a magnetic charge. Media 50 may also include optical media such as a DVD adapted to optically store digital information. A set top box 80, coupled to interface 39, is used to communicate with video and audio sources such as digital cable TV systems, digital satellite, and the like and is adapted to handshake with the disc drive electronics 30 so as to control the inflow/outflow and protection of copy protected data. The step top box 80 is of any conventional design adapted to receive digital information and transmit the information to the interface, and communicate with the disc drive electronics 30 through interface 39 to interface/disc/servo controller 31. The set top box may communicate with the interface through any conventional communication mode such as SCSI, ATA, serial, IEEE 488, and any other form of electronic data transfer. Illustrative multimedia formats include audio files (e.g., AU, WAV, AIFF, MIDI, MP3), video files (e.g., MPEG, AVI), image files (GIF, JPEG, XBM, TIFF, PICT, Raster file) and other formats known in the art.

The interface/disc/servo controller 31 provides a translation and command interface between the set top box 80 and disc drive electronics 30 through the interface 39. The interface/disc/servo controller 31 is directly connected to the buffer memory 32 through a memory bus connection 66. The buffer memory 32 may store program code and/or data for use with the operation of the drive. Interface/disc/servo controller 31 is also connected via a read/write bus 44 to CPU 34 used for processing the disc drive commands, the code memory 35 is adapted to store operational data and commands, and the servo power electronics 36 are adapted to operate the servomotor 41 and actuator arm 49. Servo power electronics 36 are typically connected to the HD 82 via servo control connection 84 to a plurality of FET switches 37 that control the spin motor 41. The HDAI 38 provides an electrical connection between the printed circuit board assembly (PCBA) 84 including the internal disc drive electronics 30, and the HD 82 including the disc drive internal mechanical and electromechanical components. Read/write channel electronics 33 used to transmit data to and from the media 50 via data bus 42 include read write logic 33a, write logic 33b, and servo logic 33c, and includes a connection to the interface/disc/servo controller 31 through data bus 42. A serial bus 43 is also used to send configuration commands from the CPU 34 to the read/write channel electronics 33.

FIG. 1 is merely one hardware configuration for a disc-drive data storage system. A preferred embodiment of the present invention can apply to any comparable hardware configuration, regardless of whether the disc-drive data storage apparatus is a complicated, multi-media storage apparatus including a plurality of media types, or a single disc-drive data storage apparatus.

Figure 2:
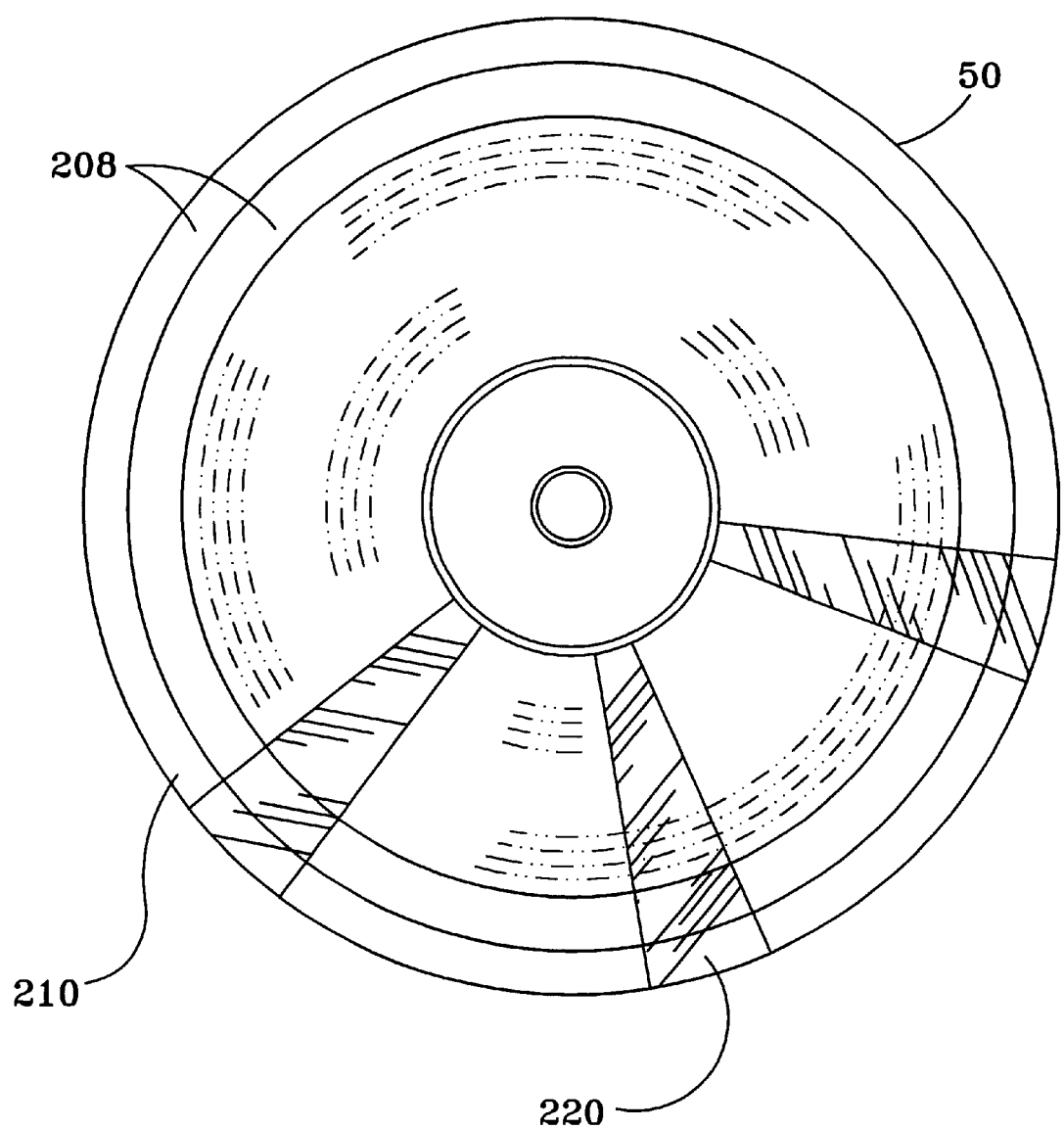
FIG. 2 is a plan view of typical media for storing data wherein the present invention may be used to advantage.

FIG. 2 is a plan view of the media 50 for storing data wherein the present invention may be used to advantage. FIG. 2 illustrates exemplary data storage tracks 208 on the media 50 including data wedges 210 separated by a plurality of servo wedges 220 in accordance to the present invention. As necessary, FIG. 1 is referenced in the following discussion of FIG. 2. For clarity, only portions of the tracks 208 are shown. Illustratively, a plurality of concentric tracks 208 are shown representing a plurality of data wedges 210 and servo wedges 220 extending across the media for data storage and retrieval by the read/write head(s) 40. As the read/write head(s) 40 fly over the media 50, the servo actuator 47 moves the actuator arm 49 and read/write head(s) 40 to a particular track 208 on the media 50 in response from commands of the interface/disc/servo controller 31. The data wedges 210 are generally used for storing external data from an external user such as multimedia files and are generally accessible by the user through the interface 39. Several adjacent tracks 208 can be combined together to create a "zone" of tracks 208 with similar data densities. The "zone" may represent several data wedges 210. Servo wedges 220 are portions of each track 208 that may include read/write head(s) alignment indicia, physical address information, and check pointing data used for defect management. Servo wedge data is generally for the drive use and is generally inaccessible to the outside user.

Figure 3:
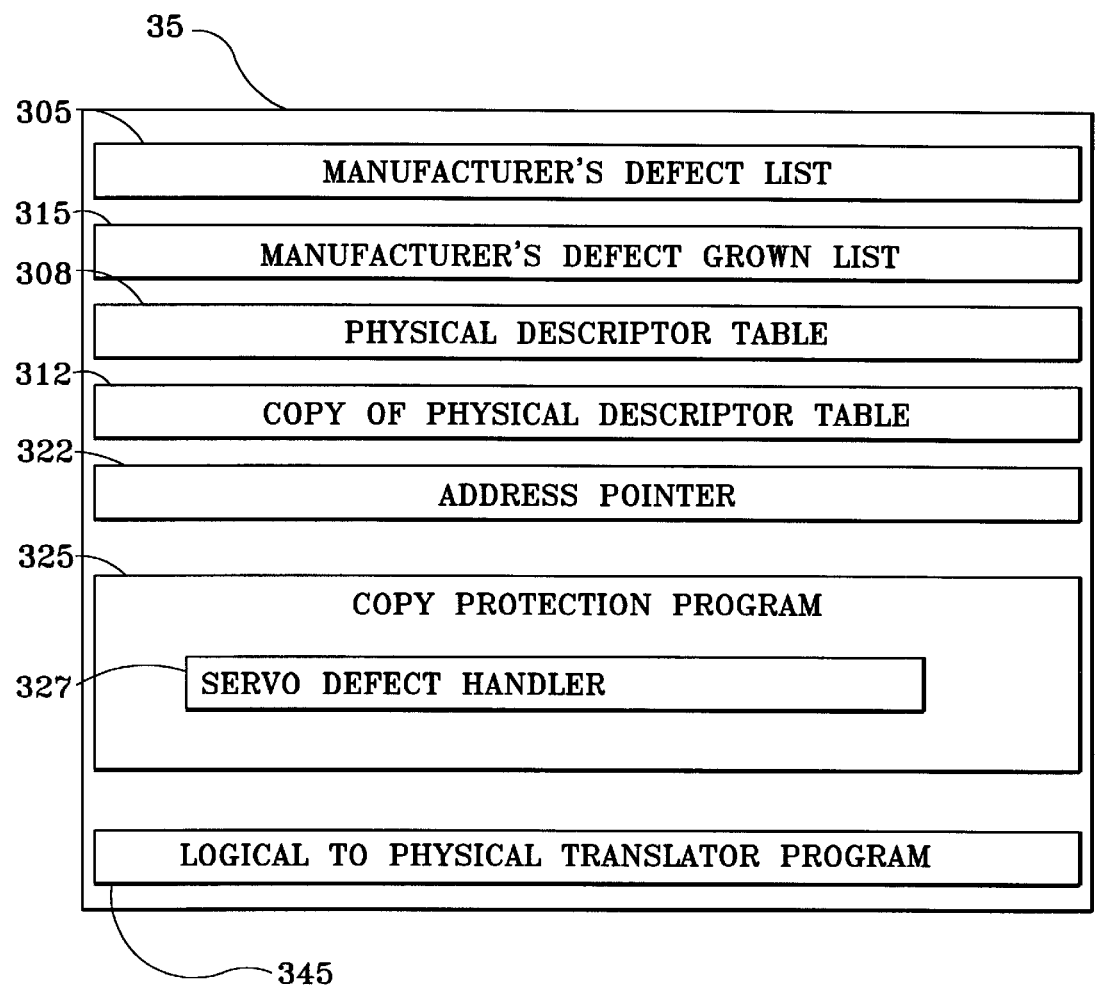
FIG. 3 illustrates a memory core for storing programming data in which the present invention may be used to advantage.

FIG. 3 illustrates the code memory 35 for storing programming data in which the present invention may be used to advantage. The code memory 35 is preferably random access memory sufficiently large to hold the necessary programming and data structures of the invention. The code memory 35 may be used to store operating code, and other run-time code that enables the drive. The contents of the code memory 35 may also be stored to a plurality of reserved areas of the media 50 or into other areas of the drive electronics 30 such as buffer memory 32 for redundancy.

The code memory 35 further includes a logical to physical translation program 345 adapted to transform logical block addresses (LBA) to physical media coordinates. Data communicated to and from a data storage system is normally managed by the LBA rather than by physical address. Data sectors are numbered blocks of data to be stored and retrieved. Data sectors are the fundamental units of data handled by the data storage system and are usually of fixed length, e.g., 512 bytes. In one aspect of the invention, one data sector equals the length of one data wedge 210. However, if the data wedges 210 are large, as is often the case with magnetic storage systems, several logical addressed data sectors may be stored in a single physical data wedge 210. The physical translation program 345 coordinates the translation of the logical address of a particular block of data to the physical address of the location at which the data is stored.

The coordination between logical addressing and physical addressing is complicated by defects in the recording material in which the data cannot be reliable stored and retrieved. Defects should therefore be skipped, that is, no attempt should be made to either write to or read from them. The details of one exemplar defect management method and apparatus is disclosed in U.S. patent application Ser. No. 09/241,795, entitled "Apparatus and Method for Efficient Defect Management In a Magneto-Optical data Storage System," Belser et al., filed on Feb. 1, 1999, which is incorporated herein by reference in its entirety.

During manufacture, the recording media 50 is usually written to and then read back from to determine which physical addresses are defective. As part of the process of converting a logical block address to a physical location on the media 50 two lists are stored in code memory 35, a manufacturer's defect list 305 (e.g., table) and a physical descriptor table 308 (e.g., list). The physical descriptor table 308 generally includes servo data that indicates how many bytes of data may be written between each servo wedge 220 and may indicate if the servo wedge 220 is to be skipped. Additionally, the physical descriptor tables 305 may indicate that a zone needs to be skipped as there may be a very large defect in the media 50 covering more than one data wedge 210 within a zone. To skip a zone, the descriptor table "folds a wedge out" by indicating that the sets of servo wedges 220 adjacent each side of the defective zone, i.e. the wedges that subtend the zone, are defective, thereby skipping all of the data sectors within a zone. The manufacture's defect list 305, i.e., the drive's defect list, maps the defect relationship between logical and physical addresses between the non-defective physical addresses and logical addresses, and is stored on the media 50 by the manufacture and loaded into the code memory 35 during operation. Additionally, as the media 50 is used, other defects may occur through, for example, the read/write head(s) 40 inadvertently touching the surface of the media 50 during a read and/or write operation and physically damaging a data sector on the media 50. Media defects subsequent to the manufacturer's defect list 305 are placed in the manufacturer's defect grown list 315. Thus, the manufacturer's defect grown list 315 literally "grows" as the media 50 is used. The logical to physical translator program 345 uses the physical descriptor table 308, the manufacturer's defect list 305, and manufacturer's defect grown list 315 to determine if the requested sector(s) have moved due to defects during a read or write sequence. The code memory 35 also includes an address pointer 322 used to point the logical to physical translation program 345 to the physical descriptor table 308 or to the copy of the physical descriptor table 312.

The code memory 35 further includes the copy protection program 325 used to allow the reading and writing of copy-protected data. The copy protection program 325 generally includes code specific to the operation of the copy-protection scheme such as a servo defect handler 327 code. The servo defect handler code 327 is used to determine defective servo wedges 220 and instructing the address pointer 322 to point to the physical descriptor table 308 if the copy protection program 325 is not called or to point to the copy of the physical descriptor table 312 if the copy protection program 325 is called. While code memory 35 is shown as a single entity, it should be understood that code memory 35 may in fact may be volatile or non-volatile, comprise a plurality of modules, and that the code memory 35 may exist at multiple levels, from high speed registers and caches to lower speed but larger DRAM chips.

Figure 4:
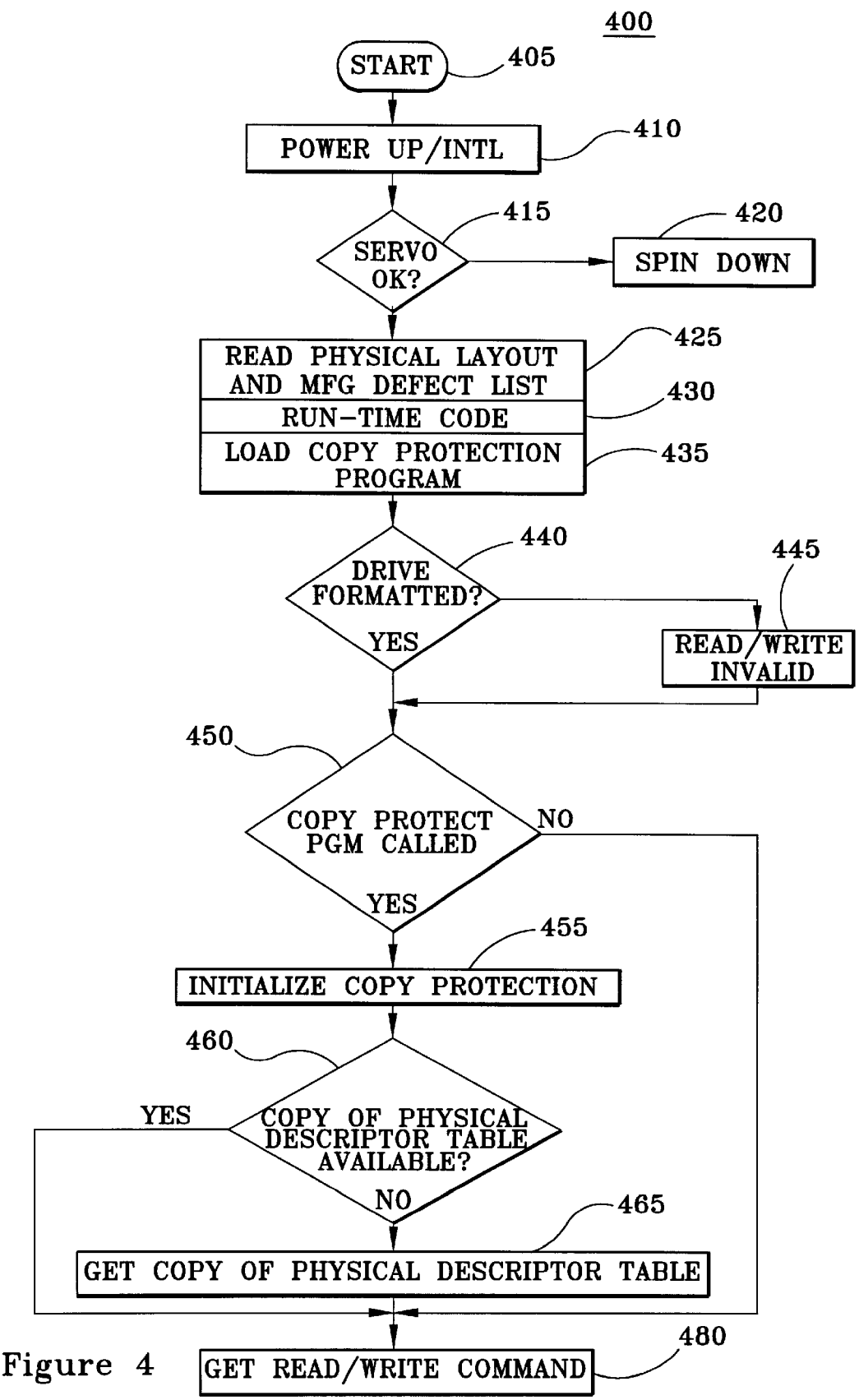
FIG. 4 is a flow diagram of a method for a start-up sequence for the disc-based apparatus of FIG. 1 in accordance with the present invention.

FIG. 4 is a flow diagram of a method 400 for a start-up sequence for the disc-based apparatus of FIG. 1 in accordance with the present invention. As necessary, FIGS. 1–3 are referenced in the following discussion of FIG. 4.

FIG. 4 is entered at step 405 when for example the set top box 80 instructs the disc drive electronics 30 to read or write data to media 50. At step 410, the interface/disc/servo controller 31 initializes the disc drive electronics 30, CPU 34, the code memory 35, the servo power 36, FETs 37, the read/write channels 33, and the buffer memory 32 and begins the process of "spinning", i.e., rotating, the media 50 up to prepare the media 50 for a read or write operation. At step 415, the method 400 determines whether the servomotor 41 is functioning properly. If the servomotor 41 is working improperly, the method 400 proceeds to step 420 and spins the servomotor 41 down. If the servomotor 41 is functioning properly, the method 400 proceeds to step 425. At step 425, the actuator arm 49 positions the read/write transducer head(s) 40 and reads the manufacturer's defect list 305, physical descriptor table 308, and the copy of the physical descriptor table 322 list stored within a reserved area within memory and/or on the drive media 50 such as a reserved area on a servo wedge 220. At step 430, run-time code such as the address pointer 322 is loaded into the code memory 35 from the media 50 and/or memory into a separate data location to allow the normal operation of the drive. At step 435, the copy protection program 325 is loaded into code memory 35 from the media 50 and/or memory.

At step 440, method 400 determines if the media 50 is properly formatted to receive data from the read/write transducer head(s) 40. If the media 50 is not properly formatted, then method 400 proceeds to step 445 to set the read/write commands as invalid and then proceeds to step 450. If the media 50 is properly formatted, then method 400 proceeds to step 450. At step 450, the method 400 determines whether the copy protection program 325 has been called, e.g., the copy protection program 325 was called from the set top box 80. If the copy protection program 325 has not been called, then method 400 proceeds to step 480. If the copy protection program 325 has been called, then method 400 proceeds to step 455 and initializes the copy protection program 325. At step 460, the method 400 determines whether a copy of the physical descriptor table 312 has been loaded and is available. If the method 400 determines that the physical descriptor table 312 has been loaded then method 400 proceeds to step 480. If the physical descriptor table 312 has not been loaded then the method 400 proceeds to step 465 and copies the physical descriptor table 308. At step 480, method 400 receives a read or a write command. If the read/write commands at step 480 where set to invalid from step 445, then the drive would be unable to be used for storing or retrieving data from the data wedges 210. If the read/write commands are set to valid, the method 400 waits for a read or write command.

Figure 5:
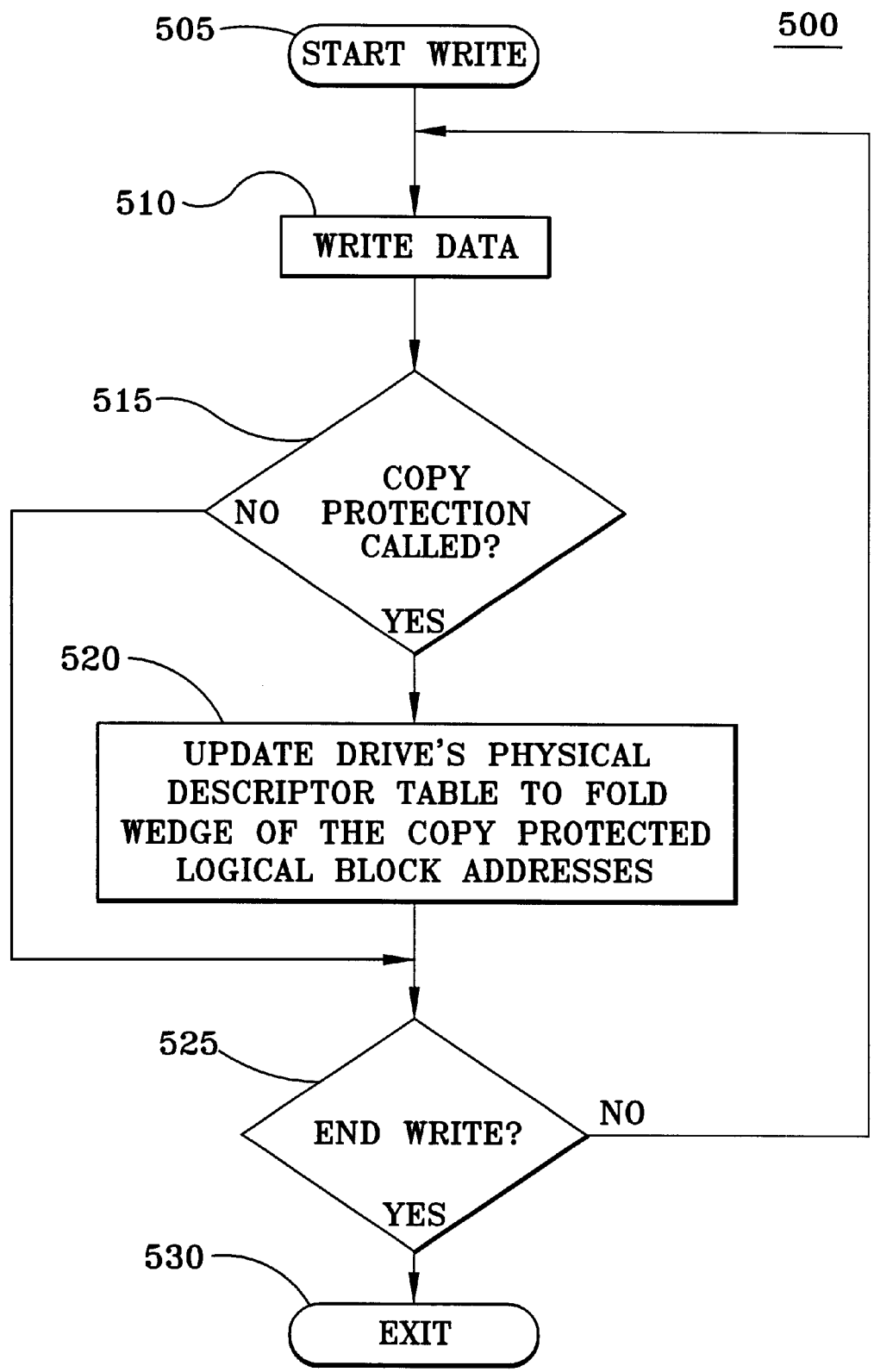
FIG. 5 is a flow diagram of a method for a write sequence for the disc-based apparatus of FIG. 1 in accordance with the present invention.

FIG. 5 is a flow diagram of a method 500 for a method of writing data on the media 50 of FIGS. 1 and 2 in accordance with the present invention. As necessary, FIGS. 1–4 are referenced in the following discussion of FIG. 5.

FIG. 5 is entered at step 505 when a write command is received at step 480. At step 510, the read/write head(s) 40 are positioned by actuator arm 49 in response to interface/disc/servo controller 31 and data is written onto the media 50. At step 510, the method 500 converts the logical addresses to physical address using the logical to physical address translation program 345 and writes the data to the appropriate sectors on the media 50. At step 515, method 500 determines whether a copy protection command via interface 39 called the copy protection program 325. In one aspect, the set top box 80 issues the copy protection command to the interface/disc/servo controller 31. If the command for copy protection was not received and/or not understood, the method 500 proceeds to step 525. If the command for copy protection was received, the method 500 proceeds to step 520. At step 520, the method 500 modifies the physical descriptor table 308 to map out the data wedge 210 between two consecutive servo wedges 220 where the copy protected data was written to, as defective, i.e., by folding a data wedge out. In one embodiment, only some of the data is written to the mapped out wedge to decrease the processing time and minimize the servo defect list data within the physical descriptor table 308. Subsequently, method 500 proceeds to step 525. At step 525, method 500 determines if the write sequence has ended. If the sequence has ended, method 500 exits at 530. If the write sequence has not ended, then method 500 returns to step 510 and continues the write sequence. Thus, if the copy protection program 325 was not called, the data may be normally written, and if the data protection program 325 was called, the data sectors written are skipped by folding a data wedge 210 where some, or all, of the copy protected data is located.

Figure 6:
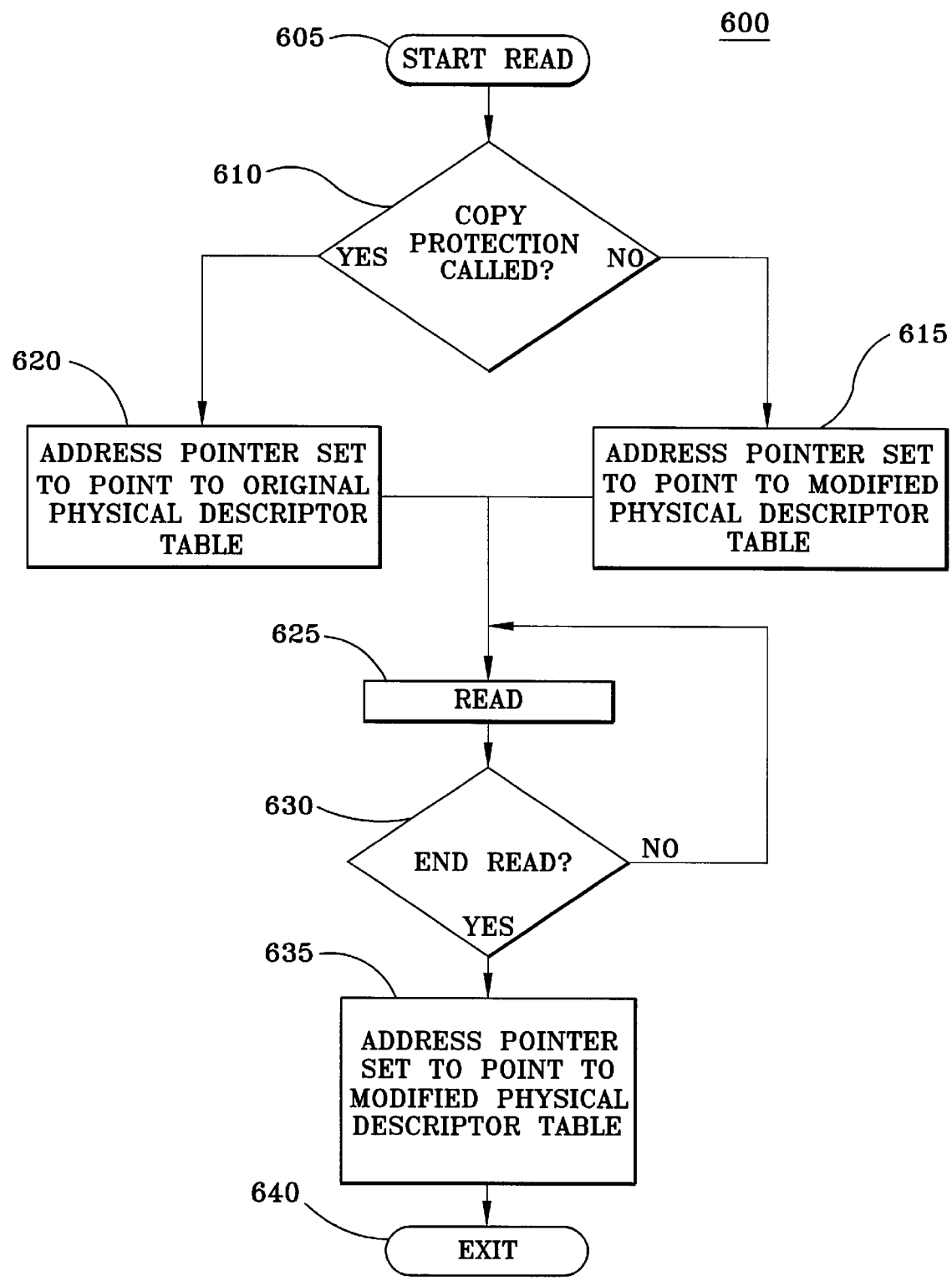
FIG. 6 is a flow diagram of a method for a read sequence for the disc-based apparatus of FIG. 1 in accordance with the present invention.

FIG. 6 is a flow diagram of a method 600 for a method of reading data from the media 50 of FIGS. 1 and 2 in accordance with the present invention. As necessary, FIGS. 1–5 are referenced in the following discussion of FIG. 6.

FIG. 6 is entered at step 605 when a read command is received at step 480. At step 610, method 600 determines if the copy protection program 325 was called. If the copy protection program 325 was not called then method 600 proceeds to step 615 and uses the physical descriptor table 308 by setting the address pointer 322 to point to the physical descriptor table 308 that has been modified from step 520, i.e., a data wedge was folded out. Method 600 proceeds to step 625 described below to read the data. If the copy protection program 325 was called, then the method 600 proceeds to step 620. At step 620, method 600 sets the address pointer 322 to point to the unmodified copy of the physical descriptor table 312 to read the data wherein the data wedge(s) 210 storing the copy protected data are not folded out. At step 625, method 600 converts the logical addresses to physical address using the logical to physical address translation program 330 and then reads the data. If the data being read was written as copy protected from method 500 and the copy protection program 325 was called, then the data reads normally as the data wedges are not folded. From step 620, if the data being read was written as copy protected from method 500, and the copy protection program 325 was not called, then the data reads sector 305 indicates that the data sector locations of the copy protected material as bad e.g., "sector(s) not found". At step 630, method 600 determines if the read sequence has ended. If the read sequence has ended, the method 600 proceeds to step 635 described below. If the read sequence has not ended, the method 600 proceeds to step 625 and continues to read the data. At step 635, the address pointer 322 is set to point to the physical descriptor table 308 and exits at step 640. Thus, an unauthorized user would not be able to read the data from the disc drive as the copy protected data wedge 210 is skipped.

In summary, the present invention generally provides a method and apparatus for storing and retrieving copy protected data within storage devices such as a disc drive. One embodiment of the present invention provides a method 500 for writing on a disc drive data to be copy protected, the steps include providing data to be copy protected 505, copying a first data table, such as physical descriptor table 308 to a second data table, such as the copy of the physical descriptor table 312, writing the data to be copy protected to a least one data sector within at least a first data wedge 210 and modifying, within the first data table, the status of at least one servo wedge 220 corresponding to and adjacent the data wedge 210 as defective. In another aspect, the step of modifying comprises, within the first data table, i.e., physical descriptor table 308, modifying two consecutive servo wedges 220 subtending the data wedge as defective. In addition, before the step of providing data to be written, a step includes providing a copy protection command signal 455. The step of providing a copy protection command signal is a user selectable step 450. In one aspect, the first and second tables comprise the physical descriptor table 308. The second table comprises a copy of the physical descriptor table 312. IN one aspect, the physical descriptor table 308 comprises servo defect data. In another aspect, the step 510 of writing the data to at least a second and third data wedge 210 defining a zone of data wedges 210, modifying, within the first data table, i.e., physical descriptor table 308, the status of the servo wedges 220 subtending the zone of data wedges 220 as defective, wherein the second data wedge 210 is subtended by a second set of servo wedges 220 and the third data wedge 210 is subtended by a third set of servo wedges 220. In another aspect, the data wedges 210 are defined by a logical block address.

Another embodiment of the invention provides a method for reading 625 copy protected data from a disc drive, the steps include determining if a request to read copy protected data has been issued 610, and if the request to read copy protected data has not been issued then reading 625 at least one data servo status from a first data table, i.e., physical descriptor table 308, where the servo status indicates the data wedge 210 as defective, but, if the request to read copy protected data has been issued then reading a second servo status from a second data table, i.e., the copy of the physical descriptor table 312, which indicates the servo wedge 220 as valid and reading the data from the data wedge 210 corresponding to the servo wedge 220. In one aspect, the first and second tables comprise the physical descriptor table 308. The second table comprises a copy of the physical descriptor table 312. In addition, the physical descriptor table 308 may comprises servo defect data.

One embodiment of the present invention provides a disc drive system comprising a signal-bearing media means 50 for storing data, a code memory means 35 coupled to a read/write controller means 31 for controlling the reading and writing of data to the signal-bearing media 50, a means for reading and writing the data to the signal-bearing media 50 and a processor means 34 coupled to the code memory 35 and the read/write controller 31. The processor 34 includes a program 500 which, when executed on the processor 34 for a write sequence, is configured to perform the steps of copying a first data table to a second data table, i.e., physical descriptor table 308, writing data 510, to be copy protected to at least one data wedge 210 of the signal-bearing media 50, and modifying 520, within the first data table, the status of at least one of a first set of consecutive servo wedges 220 subtending the data wedge 210, as defective. When the program 600 is executed on the processor 34 for a read sequence, is configured to perform the steps of determining 610 if a request to read copy protected data has been issued, if the request to read copy protected data has not been issued then reading 625 at least one servo wedge status from the first data table, i.e., physical descriptor table 308, where the servo status indicates the location of the data as defective, but, if the request to read copy protected data has been issued then reading the servo wedge status data from the second data table, i.e., copy of physical descriptor table 312, where the servo status indicates the location of the data as valid and reading the data.

Although various embodiments which incorporate the teachings of the present invention have been shown and described in detail herein, those skilled in the art can readily devise many other varied embodiments within the scope of the present invention. For example, it is contemplated that the copy protection program 325 may be integral to the overall drive code, or may be an impendent module within code memory. Alternatively, the copy protection program 325 may be partially stored external to the drive and downloaded through the interface 39.

While foregoing is directed to the preferred embodiment of the present invention, other and further embodiments of the invention may be devised without departing from the basic scope thereof, and the scope thereof is determined by the claims that follow.

We claim:

1. A method for writing on a disc drive data that is copy protectable, comprising:
   providing data that is copy protectable;
   copying a first data table to a second data table;
   writing the data that is copy protectable to a least one data sector within at least a first data wedge; and
   modifying, within the first data table, the status of at least one servo wedge corresponding to and adjacent the data wedge as defective.

2. The method of claim 1, wherein the step of modifying comprises, within the first data table, modifying two consecutive servo wedges subtending the data wedge as defective.

3. The method of claim 1, wherein the first and second table comprise a physical descriptor table.

4. The method of claim 3, wherein the second table comprises a copy of the physical descriptor table.

5. The method of claim 3, wherein the physical descriptor table comprises servo defect data.

6. The method of claim 1, wherein prior to the step of providing data, a copy protection command signal is provided.

7. The method of claim 1, further comprising the step of writing the data to at least a second and third data wedge defining a zone of data wedges, modifying, within the first data table, the status of the servo wedges subtending the zone of data wedges as defective, wherein the second data wedge is subtended by a second set of servo wedges and the third data wedge is subtended by a third set of servo wedges.

8. The method of claim 7, wherein the data wedges are defined by a logical block address.

9. A method for reading copy protected data from a disc drive, comprising:
 determining if a request to read copy protected data has been issued;
 if the request to read copy protected data has not been issued then reading at least one first servo status from a first data table wherein the first servo status indicates servo wedge as defective; and
 if the request to read copy protected data has been issued then reading a second servo status from a second data table that indicates the servo wedge as valid and reading the data from a data wedge corresponding to and adjacent the servo wedge.

10. The method of claim 9, wherein the first and second table comprises a physical descriptor table.

11. The method of claim 10, wherein the second table comprises a copy of the physical descriptor table.

12. The method of claim 10, wherein the first table comprises a physical descriptor table comprising servo wedge data.

13. The method of claim 9, wherein the first servo status indicates skipping the data wedge containing the data.

14. The method of claim 9, wherein the first servo status indicates that two consecutive servo wedges subtending the data wedge are defective.

15. A disc drive system comprising:
 a signal-bearing media for storing data;
 code memory means coupled to a read/write controller means for controlling the reading and writing of data to the signal-bearing media;
 means for reading and writing the data to the signal-bearing media; and
 processor means coupled to the code memory means and the read/write controller means for writing and reading copy protectable data to and from the media;
 wherein if a request to read copy protected data has not been issued then reading at least one first servo status from a first data table wherein the first servo status indicates a servo wedge as defective, and
 if the request to read copy protected data has been issued then reading a second servo status from a second data table that indicates the servo wedge as valid and reading the data from a data wedge corresponding to and adjacent the servo wedge.

16. The system of claim 15, wherein the processor comprises a program which, when executed on the processor for a write sequence, is configured to perform the steps comprising:
 copying a first data table to a second data table;
 writing data that is copy protectable to at least one data wedge of the signal-bearing media; and
 modifying, within the first data table, the status of at least one of a first set of consecutive servo wedges subtending the data wedge as defective;
 wherein, when the program is executed on the processors for a read sequence, it is configured to perform the steps of:
 determining if a request to read copy protected data has been issued,
 if the request to read copy protected data has not been issued then reading at least one servo wedge status from the first data table wherein the servo status indicates the location of the data as defective, and
 if the request to read copy protected data has been issued then reading the servo wedge status data from the second data table wherein the servo status indicates the location of the data as valid and reading the data.

17. The system of claim 16, wherein the step of modifying the status comprises the step of marking at least one servo wedge as defective.

18. The system of claim 16, wherein the code memory means is selected from the group consisting of volatile memory and non-volatile memory and media.

19. The system of claim 16, wherein the means for reading and writing the data to the signal-bearing media comprises at least one read/write head adapted to read and write data to the media.

20. The system of claim 16, wherein the first and second table comprises a physical descriptor table.

* * * * *